Dec. 20, 1949  M. MORGAN  2,491,871
SHEARING MECHANISM
Filed Nov. 8, 1947  3 Sheets-Sheet 1

INVENTOR.
MYLES MORGAN
BY Albert G. Blodgett
ATTORNEY

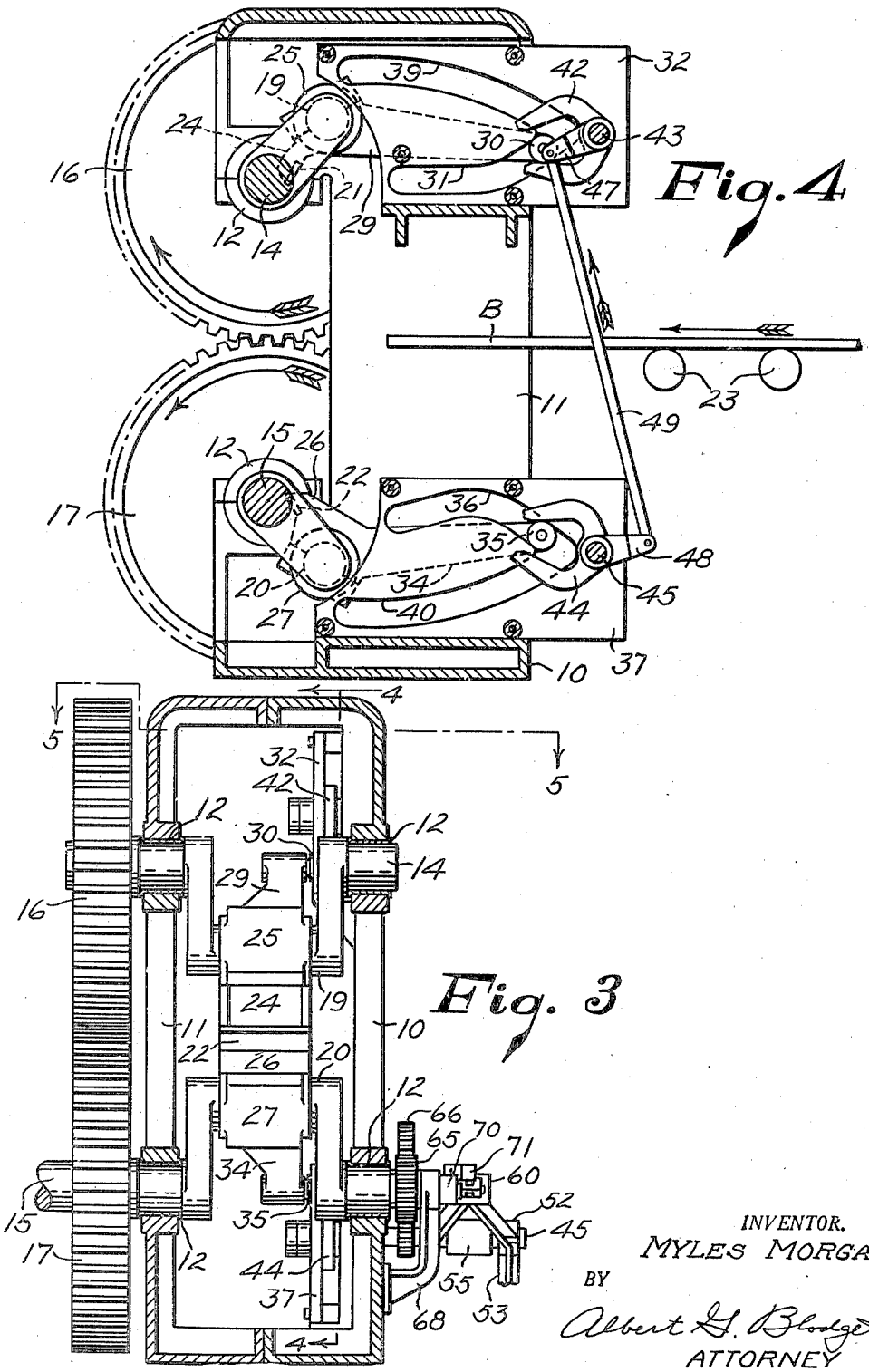

Dec. 20, 1949     M. MORGAN     2,491,871
SHEARING MECHANISM

Filed Nov. 8, 1947     3 Sheets-Sheet 3

INVENTOR.
MYLES MORGAN
BY
Albert G. Blodgett
ATTORNEY

Patented Dec. 20, 1949

2,491,871

UNITED STATES PATENT OFFICE 2,491,871

SHEARING MECHANISM

Myles Morgan, Worcester, Mass., assignor to Morgan Construction Company, Worcester, Mass., a corporation of Massachusetts Application November 8, 1947, Serial No. 784,801

6 Claims. (Cl. 164—66)

This invention relates to shearing mechanisms, and more particularly to mechanisms adapted for cutting longitudinally traveling bars, strips, or the like into pieces of a predetermined length.

In one known type of shearing mechanism two cooperating blades are mounted upon respective rotary elements so arranged that the blades will meet at each revolution and sever the bar as it travels between them. For the best results the speed of the blades at the time each cut is made must be approximately the same as the speed of the bar, and in order that this may be the case when cutting the bar into relatively long pieces it has been proposed to reduce the speed of the shear between cuts. This is feasible in many cases, but if the length of the cut pieces is considerably in excess of the length of each blade path, serious problems of inertia are encountered. It has been recognized heretofore that these problems could be simplified by arranging the shear to make a plurality of revolutions between cuts, and for this purpose it has been proposed to shift the axis of one of the rotary elements during certain revolutions and thus prevent the blades from meeting. While this can be done if the stock is comparatively light, such constructions are not considered practical for heavy work. The prior patent to Morgan et al. No. 2,157,000, granted May 2, 1939, discloses a shearing mechanism which is particularly suitable for cutting heavy stock, such as metal billets and slabs, but this mechanism as illustrated in the patent will effect a cut at each revolution.

It is accordingly one object of the invention to provide a shearing mechanism of the rotary type adapted for severing comparatively heavy longitudinally traveling bars or the like and so constructed as to make a plurality of revolutions between successive cuts.

It is a further object of the invention to alter the construction of the shearing mechanism illustrated in the said prior Patent No. 2,157,000 in such a manner as to facilitate the cutting of traveling bars and the like into comparatively long pieces.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts;

Fig. 3 is a view in section taken on the line 3—3 of Fig. 1;

Fig. 4 is a view in section taken on the line 4—4 of Fig. 3, but showing the shear blades in a different position;

Figure 2:
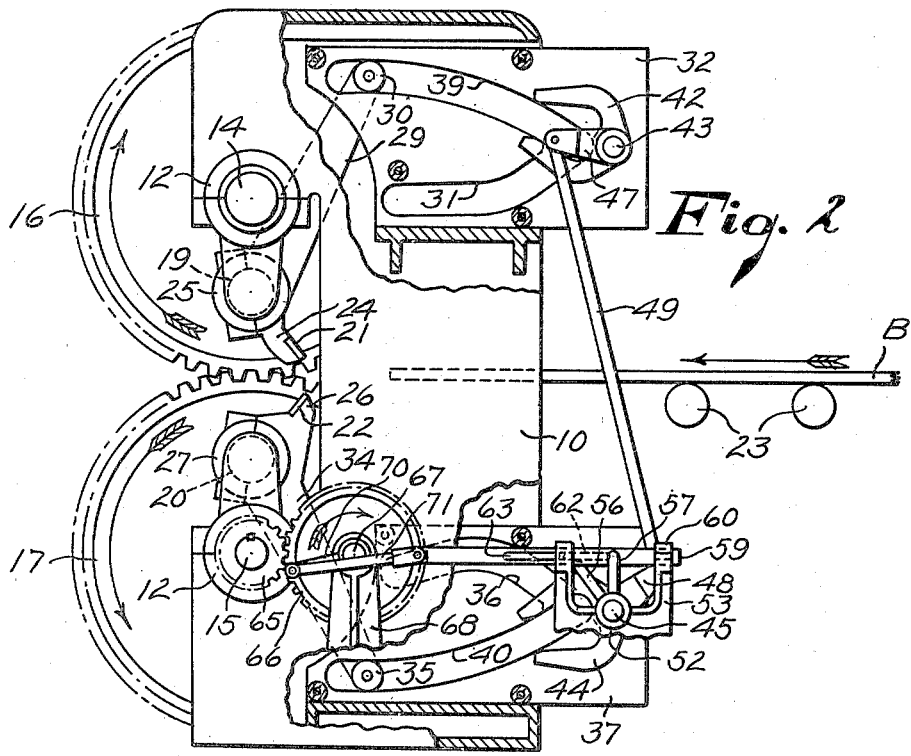
Fig. 2 is a view similar to Fig. 1, but showing the shear blades in the mis-cut position.
Figure 1:
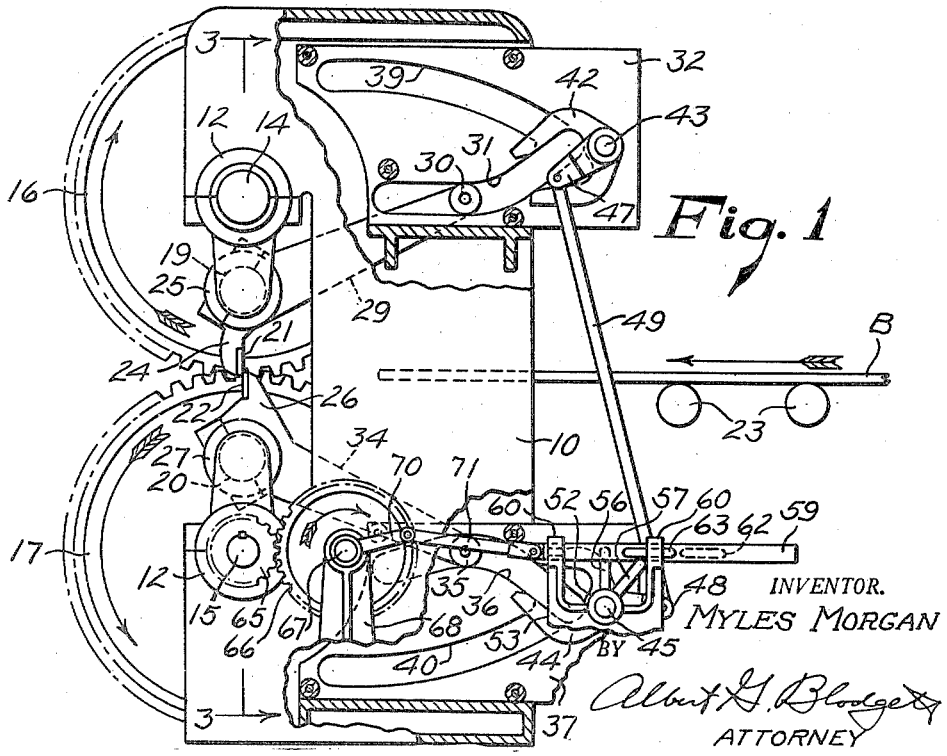
Fig. 1 is a side elevation of a shearing mechanism, with certain parts broken away for clearness of illustration, the shear blades being shown in the cutting position.
Figure 7:
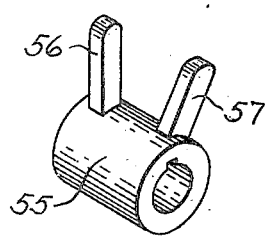
Fig. 7 is a perspective view of a sleeve forming part of the mechanism.
Figure 5:
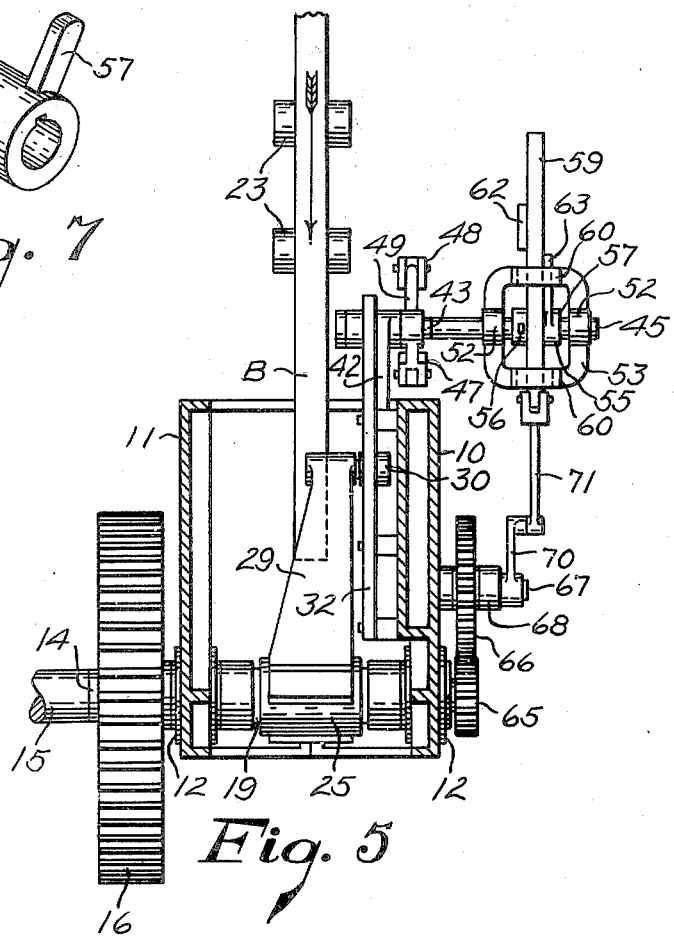
Fig. 5 is a view in section taken on the line 5—5 of Fig. 3.
Figure 6:
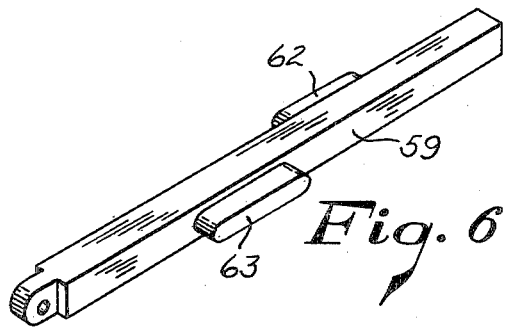
Fig. 6 is a perspective view of a slide bar forming part of the mechanism.

The embodiment illustrated comprises two upright frame members 10 and 11 with their upper and lower portions rigidly connected and their intermediate portions spaced apart laterally. These members provide suitable bearings 12—12 for an upper crankshaft 14 and also for a lower crankshaft 15, the said two shafts having secured thereon intermeshing gears 16 and 17 respectively. These gears are of equal diameters, and they are located adjacent the outer side of the frame member 11. The crankshafts are driven by any suitable source of power (not shown), and because of the gears they will rotate at the same speed but in opposite directions, as indicated by the arrows in Figs. 1, 2 and 4. The upper shaft 14 provides between its journalled portions a crank portion 19, and the lower shaft 15 provides a similar crank portion 20, these two cranks having an angular relationship such that the arrival of the upper crank at its lowest position coincides substantially with the arrival of the lower crank at its highest position, as shown in Figs. 1 and 2.

The two cranks 19 and 20 carry shear blades 21 and 22 respectively which meet at the proper times to sever desired lengths from an elongated bar or the like B. This bar B travels substantially horizontally on conveyor rollers 23 and passes between the frame members 10—11 and thence between the cranks 19 and 20. For clearness of illustration the bar is merely shown as it approaches the cranks, and no attempt has been made to show the progressive movement of the front end of the bar in the several views. The upper blade 21 is secured to a projecting arm 24 of a two-part hub structure 25 that encircles the upper crank 19, and the lower blade 22 is secured to a projecting arm 26 of a two-part hub structure 27 that encircles the lower crank 20. Thus each blade is pivotally mounted, through its associated hub structure, on the corresponding crank.

By controlling the angular positions of the blades on the cranks, it is possible to effect a severance of the bar B or to avoid such severance. For this purpose the upper blade carrier or hub structure 25 is provided with a projecting arm 29 having a cam follower or roller 30 thereon which extends through a cam slot or guideway 31 in an upright plate 32. Similarly the lower blade carrier or hub structure 27 is provided with a projecting arm 34 having a cam follower or roller 35 thereon which extends through a cam slot or guideway 36 in an upright plate 37. The two plates 32 and 37 are suitably mounted at the rear of the crankshafts on the inner side of the frame member 10, and the slots 31 and 36 are shaped to confine the movements of the rollers 30 and 35 to generally reciprocatory paths and to bring the blades into the correct shearing position (as shown in Fig. 1) when the two cranks approach one another. The upper plate 32 is provided with a second slot or guideway 39 which connects with the rear end of the slot 31 and extends upwardly and forwardly therefrom. Similarly the lower plate 37 is provided with a second slot or guideway 40 which connects with the rear end of the slot 36 and extends downwardly and forwardly therefrom. The slots 39 and 40 are so shaped as to hold the blades separated, even when the cranks approach one another (as shown in Fig. 2), so that there will be ample room for the bar B to travel between the separated blades without being engaged thereby. Thus by switching the rollers 30—35 from the slots 31—36 to the slots 39—40 or vice versa, the shear can be made to cut or mis-cut as desired.

Means is provided to switch the rollers 30—35 automatically between the slots at the proper times, so that the crankshafts will make a plurality of revolutions between successive cuts. In this manner it is possible to cut the bar into comparatively long pieces. For this purpose the rollers are made long enough to extend through the cam plates 32—37 and somewhat beyond the outer surfaces of these plates, and a suitable switching device is provided for each roller and arranged to engage the projecting portion thereof at the proper time. As shown, a switching fork 42 is secured to a horizontal shaft 43 which is pivotally supported by the upper plate 32 adjacent to the junction of the slots 31 and 39. A similar switching fork 44 is secured to a horizontal shaft 45 which is pivotally supported by the lower plate 37 adjacent to the junction of the slots 36 and 40. Each of the forks 42 and 44 preferably comprises a pair of converging fingers. A forwardly extending arm 47 is secured to the upper shaft 43, and a rearwardly extending arm 48 is secured to the lower shaft 45. These arms are connected by a link 49, the parts being so constructed and arranged that when the lower fork 44 registers with the slot 36 (as shown in Fig. 1) the upper fork 42 will register with the slot 31, and when the lower fork 44 registers with the slot 40 (as shown in Fig. 2) the upper fork 42 will register with the slot 39.

Means is provided to oscillate the switching forks 42 and 44 between the positions shown in Figs. 1 and 2, the movements taking place at such times as the rollers 30 and 35 are embraced by the respective forks. This is preferably brought about by a lost-motion mechanism driven in timed relation with the revolutions of the shear cranks 19 and 20. In the embodiment illustrated, the lower shaft 45 is extended outwardly and supported in a pair of spaced bearings 52—52 on a stationary bracket 53. A sleeve or hub 55 is keyed to the portion of the shaft between these bearings, this hub having two axially spaced fingers 56 and 57 projecting upwardly therefrom. A horizontal bar 59 of rectangular cross section extends above the hub 55, between the fingers 56 and 57, and at right angles with the shaft 45. This bar is slidably supported by suitable spaced guide bearings 60—60 on the bracket 53. On the inner side of the bar 59 there is provided an elongated lug 62, and on the outer side of the bar there is provided an elongated lug 63, these lugs being in position to engage the fingers 56 and 57 respectively as the bar is reciprocated, thereby rocking the shaft 45. This in turn rocks the upper shaft 43 through the medium of the link 49 and the arms 47 and 48.

The bar 59 is reciprocated by mechanism connected to the lower crankshaft 15. This mechanism includes a pinion 65 keyed to the shaft 15 adjacent the outer side of the frame member 10 and meshing with a gear 66 keyed to a shaft 67, the latter being rotatably supported by a bracket 68. On the outer end of the shaft 67 there is secured a crank 70 which is connected to the front end of the bar 59 by a link 71. The gear 66 is provided with twice the number of teeth as the pinion 65, so that the crank 70 will revolve at one-half the speed of the crankshaft 15. Hence the bar 59 will make one stroke for each revolution of the shear cranks 19—20.

The operation of the invention will now be apparent from the above disclosure. The crankshafts 14 and 15 will be driven by a suitable source of power in the directions indicated by the arrows. With the rollers 30—35 located in the slots 31—36 respectively, as shown in Fig. 1, the arms 29—34 will hold the blades 21—22 in the cutting position as the cranks 19—20 approach one another. Consequently if the bar B is traveling between the blades it will be severed. After such severance the continued rotation of the gear 66, acting through the crank 70 and the link 71, will slide the bar 59 forwardly and bring the lug 62 thereon into contact with the finger 56 and rock the shaft 45 and the switching fork 44 in an anti-clockwise direction into registration with the slot 40. At the same time the switching fork 42 will be rocked in a clockwise direction into registration with the slot 39 through the medium of the connecting link 49. Shortly before these movements of the forks begin, the rollers 30 and 35 will enter the forks 42 and 44 respectively, and the movements of the forks will be completed in time to direct the rollers into the slots 39 and 40 respectively as the rollers are moved forwardly again by the action of the cranks 19 and 20. In Fig. 4 the forks have started to move in the manner described.

Referring now to Fig. 2, it will be seen that as the cranks 19 and 20 complete one revolution and approach one another again, the blades 21—22 will be held in a separated position, and the bar B may travel freely between them without being severed. As the cranks continue to revolve, the link 71 will move the bar 59 rearwardly in its guides 60, bringing the lug 63 into contact with the finger 57. This will rock the forks 42 and 44 back into the positions shown in Fig. 1, but shortly before they start their movement, the rollers 30 and 35 will have entered the forks. Consequently the rollers will again travel in the slots 31—36, and a severance of the bar B will take place as the crankshafts 19—20 next approach one another. It will thus be apparent that the shear will continue to make cuts and mis-cuts alternately, and it is feasible to cut much longer pieces from the bar B than would be possible if the shear made a cut at each revolution.

Having thus described my invention, what I claim as new and desire to secure by Letters Patent is:

1. A mechanism for shearing longitudinally moving stock comprising a pair of revoluble cranks, a member pivotally mounted on each crank, a blade mounted on each member, an arm projecting from each member, a follower on each arm, means providing a fixed guideway for each follower arranged to guide the same in a generally reciprocatory path such as to procure periodic cutting oppositions of the blades as the cranks revolve, means providing a second fixed guideway for each follower arranged to guide the same in a generally reciprocatory path such as to avoid cutting oppositions of the blades, and means effective to shift each follower from one of its guideways to the other.

2. A mechanism for shearing longitudinally moving stock comprising a pair of revoluble cranks, a member pivotally mounted on each crank, a blade mounted on each member, an arm projecting from each member, a follower on each arm, means providing a pair of intersecting fixed guideways for each follower arranged to guide the same in two generally reciprocatory paths, one guideway in each pair being such as to procure periodic cutting oppositions of the blades as the cranks revolve and the other guideways being such as to avoid cutting oppositions of the blades, and devices adjacent the intersections of the guideways to switch the followers from one guideway to the other.

3. A mechanism as set forth in claim 2, in which each switch device comprises a forked member pivotally supported for movement into registration with each of the adjacent guideways.

4. A mechanism as set forth in claim 2, in which means is provided to actuate the switch devices in timed relation with the revolutions of the cranks.

5. A mechanism as set forth in claim 2, in which a lost-motion mechanism is provided to actuate the switch devices in timed relation with the revolutions of the cranks.

6. A mechanism as set forth in claim 2, in which each switch device comprises a forked member having a pair of converging fingers and pivotally supported for movement into registration with each of the adjacent guideways, and in which means is provided to actuate the switch devices in timed relation with the revolutions of the cranks.

MYLES MORGAN.

REFERENCES CITED

The following references are of record in the file of this patent:

UNITED STATES PATENTS

| Number | Name | Date |
| --- | --- | --- |
| 1,969,433 | Talbot | Aug. 7, 1934 |
| 1,973,515 | Smitman | Sept. 11, 1934 |